US008429248B1

(12) United States Patent
Ketrenos et al.

(10) Patent No.: US 8,429,248 B1
(45) Date of Patent: Apr. 23, 2013

(54) DISTRIBUTED FILE SYSTEM INCLUDING MULTICAST RETRIEVAL

(75) Inventors: James P. Ketrenos, Austin, TX (US); Edward R. Rhoads, Sherwood, OR (US); Charles R. Lynch, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/466,113

(22) Filed: Dec. 17, 1999

(51) Int. Cl.
*G06F 15/16* (2006.01)

(52) U.S. Cl.
USPC .......................... 709/219; 709/217; 709/218

(58) Field of Classification Search .................. 714/129, 714/153, 147; 711/100; 709/215, 217, 221, 709/317, 223, 224, 219, 229, 230; 707/200, 707/205, 204, 10, 8, 201; 713/2, 100
See application file for complete search history.

(56) References Cited

U.S. PATENT DOCUMENTS

| 5,758,125 | A | * | 5/1998 | Misinai et al. | 703/23 |
| 5,838,916 | A | * | 11/1998 | Domenikos et al. | 709/219 |
| 5,850,522 | A | * | 12/1998 | Wlaschin | 395/200.45 |
| 5,953,350 | A | * | 9/1999 | Higgins | 370/524 |
| 5,978,381 | A | * | 11/1999 | Perlman et al. | 370/432 |
| 6,161,104 | A | * | 12/2000 | Stakutis et al. | 707/10 |
| 6,182,121 | B1 | * | 1/2001 | Wlaschin | 709/215 |
| 6,256,673 | B1 | * | 7/2001 | Gayman | 709/232 |
| 6,269,080 | B1 | * | 7/2001 | Kumar | 370/236 |
| 6,272,127 | B1 | * | 8/2001 | Golden et al. | 370/352 |
| 6,272,523 | B1 | * | 8/2001 | Factor | 709/201 |
| 6,279,029 | B1 | * | 8/2001 | Sampat et al. | 709/203 |
| 6,421,777 | B1 | * | 7/2002 | Pierre-Louis et al. | 713/2 |
| 6,513,048 | B1 | * | 1/2003 | Engle et al. | 707/200 |

FOREIGN PATENT DOCUMENTS

| GB | 2 330 433 | 4/1999 |
| WO | WO 93/24890 | 12/1993 |
| WO | WO 01/24474 | 4/2001 |

OTHER PUBLICATIONS

A. Emberson, *Request for Comment 2090:TFTP Multicast Option*, Feb. 1997, pp. 1-6.
K. Sollins, *Request for Comment 1350: The TFTP Protocol (Rev. 2)*, Jul. 1992, pp. 1-11.
Intel Corporation, *Preboot Execution Environment (PXE) Specification, Version 2..1*, Sep. 20, 1999, pp. 1-85.
Janson, Bruce, Kummerfeld, Bob; Soda: *A File System for a Multicomputer*, In: Proceedings of 1st IEEE Computer Society Intl. Workshop on Cluster Computing (Dec. 2-3, 1999, Melbourne), pp. 131 to 136, DOI: 10.1109/IWCC.1999.810817.

(Continued)

*Primary Examiner* — Adnan Mirza
(74) *Attorney, Agent, or Firm* — Trop, Pruner & Hu, P.C.

(57) ABSTRACT

A distributed file system intelligently allocates portions of a file system from a server to one or more clients on a network. File system data used during power-on of a client may be stored on the client. A retrieval of the file system may subsequently be made to the extent the client has capacity to store the file system. A multicast operation, performed as a background operation on the client, may be used to retrieve the file system. For portions of the file system not allocated to the client, the client may still access the file system from the server. Network bandwidth may thus be reduced and client access to the file system may generally be more efficient.

15 Claims, 5 Drawing Sheets

OTHER PUBLICATIONS

German Patent Office, Office Action with English translation issued in corresponding German Application No. 100 85 311.0-53, 7 pages, Feb. 10, 2010.

Björn Grönvall, "A Multicast-Based Distributed File System for the Internet", ACM SIGOPS 1996, pp. 95-102.

* cited by examiner

DISTRIBUTED FILE SYSTEM INCLUDING MULTICAST RETRIEVAL

BACKGROUND

This invention relates to networks and, more particularly, to file retrieval over networks.

Computer networks are often described using models. One network model, known as the client-server model, consists of users (the clients) and file servers, upon which data is generally stored. In the client-server model, the client generally makes a request to the server, the server services the request, and the server sends the reply back to the client. Typically, the ratio of clients to servers is very high.

As expected, the server is typically a very powerful, high-capacity machine, including perhaps multiple processors and tremendous storage capacity. On the other hand, the clients which occupy the network may come in a variety of configurations. Typically, however, the clients are more modest in their hardware features than servers.

Retrieval of data by a client from a server involves a connection between the client and the server over the network. This connection (sometimes referred to as a "socket") remains viable (or open) for the duration of the request. The connection takes time to initiate, making network accesses generally slower than local accesses, such as accesses to a client's hard disk. Furthermore, each connection between a client and a server consumes bandwidth. The available bandwidth on a network is finite.

One way to diminish network bandwidth is to broadcast data from a server to the network. When data is broadcast over the network, a single socket is opened. All clients on the network may receive the data, including some unintended recipients. Multicast transmission is another option for minimizing network bandwidth. Like broadcasting, multicasting is the process of sending a message or data simultaneously to more than one destination on a network. With multicasting, however, the intended clients may be specifically limited; unintended recipients are not able to access to the transmitted data.

For some clients, local retrieval of server files or data may be desirable, both to speed access and to diminish the bandwidth expended on the network. However, the needed files may be large in comparison to the capacity of the client to store the files locally.

Thus, a need exists to distribute a file system located on a server to one or more clients in accordance with the distinct characteristics of each client.

SUMMARY

In general, according to one embodiment, a method includes receiving a request for a portion of a file system by a client, identifying whether the portion is stored in a first location associated with portions of the file system that have been used by the client previously, and, if not, determining whether the portion is stored in a second location associated with portions of the file system that were streamed to the client by a server.

Other aspects are set forth in the accompanying detailed description, the drawings, and the claims.

DETAILED DESCRIPTION

In accordance with one embodiment of the invention, a distributed file system includes multicast retrieval for one or more clients located on a network. A portion of the file system needed by the client at power-on is allocated to a first storage location on the client. A second portion of the file system is then retrieved during runtime operation of the client. This second portion may be retrieved from a server on the network as a multicast operation. The multicast retrieval occurs as a background operation. In other words, a user on the client may run other programs and perform other operations while the multicast operation occurs. The file system remains accessible from the server in response to requests which are not stored in the first or second storage locations of the client.

Figure 1:
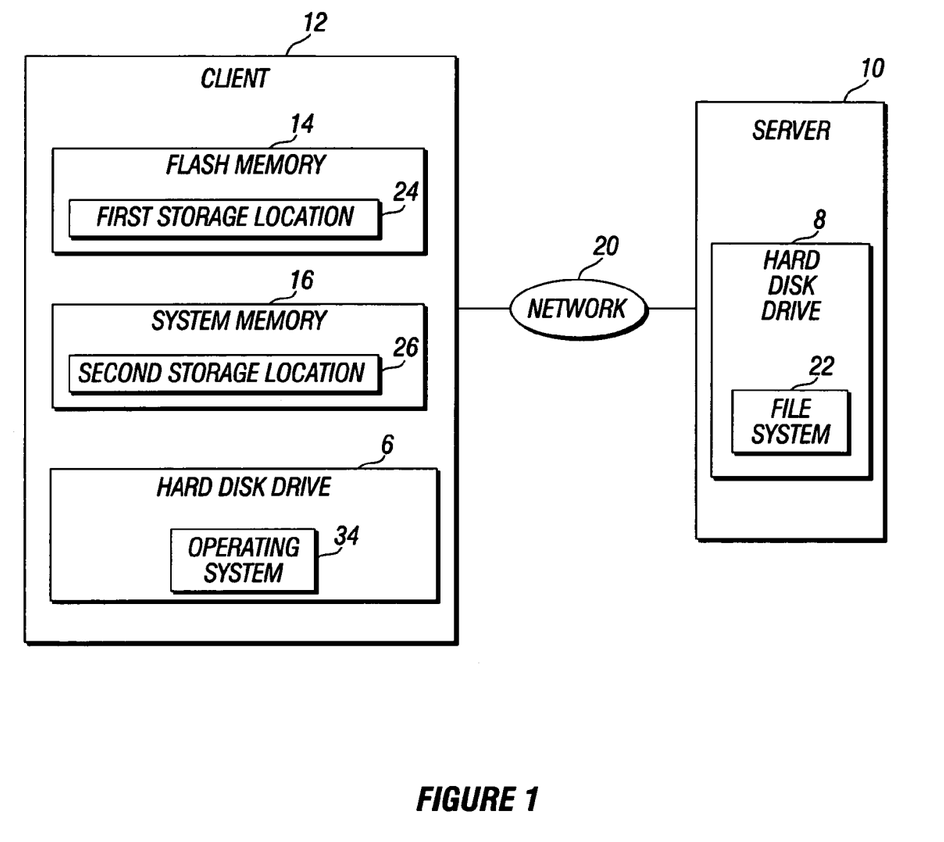
FIG. 1 is a block diagram of one configuration of a client-server network for use with the distributed file system according to one embodiment of the invention.

Turning to FIG. 1, in one embodiment of the invention, a file server 10 is coupled to a network 20. One or more clients 12 may be coupled to the network 20 as well. Requests by the client 12 may be made to the server 10, followed by replies by the server 10 to the client 12.

The client 12 may be a processor-based system such as a desktop computer system, a handheld computer system, a processor-based television system, a set top box, an appliance, a thin client, a cellular telephone, or the like. The network 20 may be any of a variety of networks including a local area network (LAN), a metropolitan area network (MAN), a wide area network (WAN), a wireless network, a home network or an internetwork such as the Internet.

A file system 22 is stored on the file server 10. The file system 22 may be stored on a hard disk drive 8 and accessed by one or more clients 12 on the network 20.

The client 12 may include both a first storage location 24 and a second storage location 26. The first storage location 24 may include any medium which retains stored information after power is removed from the client 12, e.g., a non-volatile medium. In one embodiment of the invention, the first storage location 24 is a flash memory device 14. The first storage location 24 may alternatively include a read-only memory (ROM), an erasable, programmable read-only memory (EPROM), a hard disk drive, a compact disk read-only memory (CD ROM), or other non-volatile storage media.

The second storage location 26 may include any medium which may store data during runtime operation of the client 12. In one embodiment of the invention, a system memory 16 is used as the second storage location 26. System memory 16 is volatile. That is, the data does not remain in the system memory 16 once power is removed from the client 12. Alternatively, however, a non-volatile storage medium, such as a hard disk drive, may be used for the second storage location 26.

In one embodiment of the invention, the client 12 will retrieve some or all of the file system 22 from the server 10. The retrieved file system 22 may then be stored in the first storage location 24 and the second storage location 26. Subsequently, accesses to the file system 22 by the client 12 need not involve the server 10, as will be explained hereinafter.

Looking back to FIG. 1, the client 12 also includes a hard disk drive 6, upon which is stored an operating system 34. The operating system 34 may receive requests for the file system 22, from application programs, from the user of the client 12, or from other sources. Although the operating system 34 is stored on the hard disk drive 6 in one embodiment of the invention, the operating system 34 may alternatively be stored in other non-volatile media, such as the flash memory 14.

Figure 2:
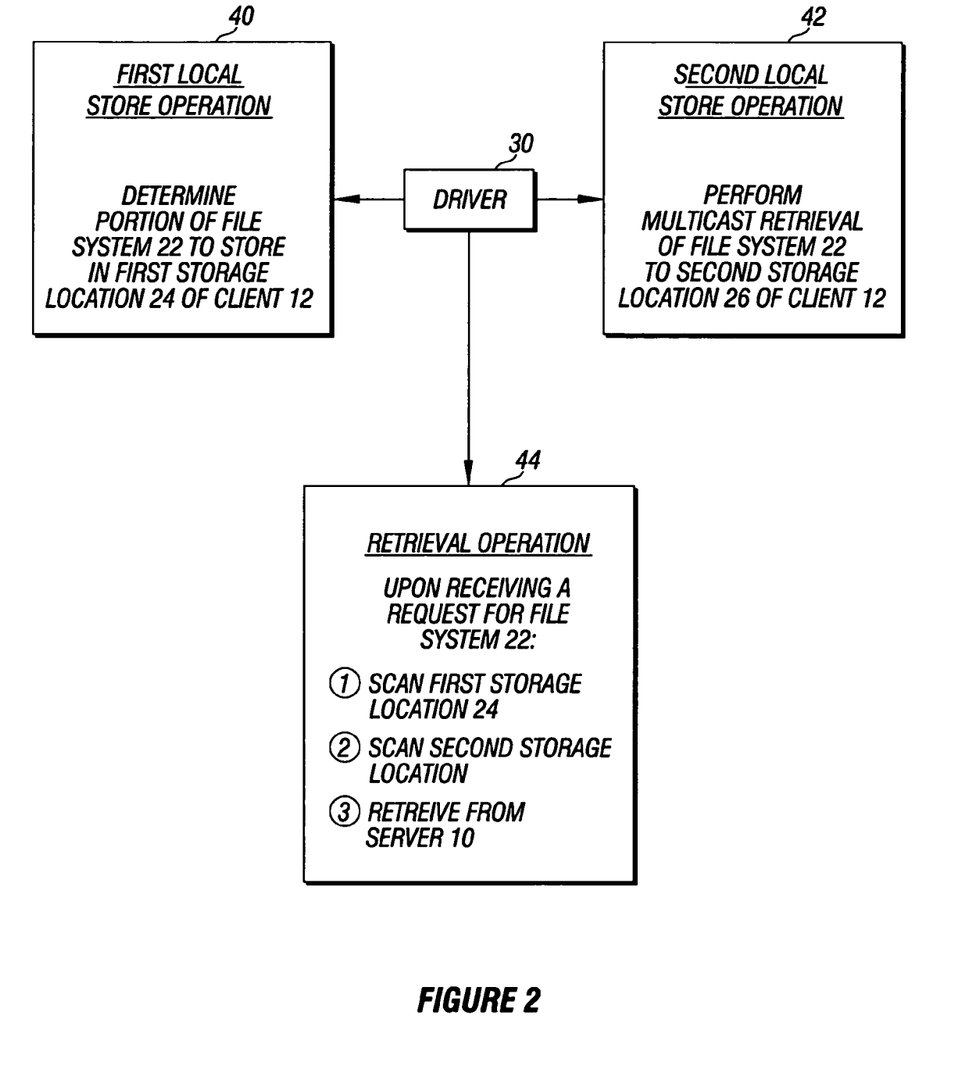
FIG. 2 is a block diagram of the tasks of the driver according to one embodiment of the invention.

Turning to FIG. 2, in one embodiment of the invention, a driver 30 performs operations to both distribute the file system 22 and to respond to requests for the file system 22. A driver is a hardware device or program that controls or regulates another device. The driver 30 may control accesses to the file system 22 by the client 12. Further, the driver 30 may control storage of part or all of the file system 22 on the client 12.

In one embodiment of the invention, the driver 30 may distribute the file system to the client 12. The distribution of the file system is made to the first storage location 24 and second storage locations 26 of the client 12.

In one embodiment of the invention, the driver 30 may also respond to requests for portions of the file system 22. The driver 30 intercepts a request from the operating system 34 and searches the first storage location 24 of the client 12 for the requested file portion. If the requested portion of the file system 22 is not found, the driver then searches the second storage location 26 of the client 12 for the requested portion. Finally, should the requested portion not be stored on the client system 12, the driver 30 retrieves the requested portion from the server 10 located on the network 20.

In FIG. 2, the distribution of the file system 22 and the response to requests for the file system 22 are shown as three distinct operations. These three operations may alternatively be performed in combination or may be further subdivided, as desired. The diagram of FIG. 2 is meant only to illustrate the distinct functions of the driver 30, not to suggest organization thereof.

A first local store operation 40 may be performed by the driver 30 to store some portion of the file system 22 in the first storage location 24 of the client 12. A second local store operation 42 may be performed by the driver 30 to store some portion of the file system 22 in the second storage location 26 of the client 12. The two operations 40 and 42 distribute the file system 22 to the client, as described above.

A retrieval operation 44 is performed by the driver 30 to respond to requests for the file system 22. In one embodiment of the invention, the retrieval operation 44 is performed once the contents of the first and second storage locations 24 and 26 have been secured, e.g., after the first local store operation 40 and the second local store operation 42 are complete. Once all or part of the file system 22 is locally stored, retrieval from the file server 10 is less likely to be necessary. However, the driver 30 is responsive to requests for the file system 22 regardless of whether any portion of the file system 22 is stored in the first or second storage locations 24 and 26.

During the first local store operation 40, the driver 30 determines the portion of the file system 22 to store in the first storage location 24 of the client 12. In one embodiment of the invention, the first local store operation 40 is performed the first time the client 12 is connected to the network 20. The first storage location 24 then stores a portion of the file system 22. Because the first storage location 24 is non-volatile, the contents remain available each time the client 12 is powered on. Thus, in one embodiment of the invention, the first local store operation 40 is performed only one time.

To perform the first local store operation 40, in one embodiment of the invention, the driver 30 is available prior to any access of the file system 22 by the client 12. Thus, for example, the driver 30 is loaded prior to a connection by the client 12 to the network 20. In one embodiment of the invention, the driver 30 is stored in the flash memory 14 of the client 12. The driver 30 may thus be run soon after power-on of the client, and accordingly, prior to any connection with the network 20 by the client 12.

Alternatively, the driver 30 may be stored on the hard disk drive 6 of the client 12 (FIG. 1). In one embodiment of the invention, a portion of the operating system 34 is stored in the flash memory 14, such that the operating system 34 may load the driver 30 prior to certain operations, such as a connection with the network 20. For example, the LINUX operating system may operate in such a configuration.

As another option, for performing the first local store operation 40, the driver 30 need not be stored on the client 12. Instead, in one embodiment of the invention, the driver 30 is run from a second client. When the client 12 connects to the network 20, the driver 30 monitors accesses to the file system 22 by the client 12. Other configurations of the driver 30 for performing the first local store operation 40 are possible as well.

The second local store operation 42 also retrieves a portion of the file system 22, this time to be stored in the second storage location 26. In one embodiment of the invention, the second local store operation 42 is a multicast operation to retrieve the file system 22. Further, the second local store operation 42 may be a background operation of the client 12.

Background operations are performed without interaction or involvement of the user of the client 12 and may occur while the user is performing other tasks. By retrieving in the background, even large file systems may be recovered without seriously disrupting the use of the client 12. In one embodiment of the invention, the second local store operation 42 is performed each time the client 12 powers on.

The retrieval operation 44 is any request for the file system 22 by a user of the client 12, by the operating system 34 of the client 12, or by other application software. In one embodiment of the invention, the driver 30 retrieves the requested data by first scanning the first storage location 24. If not found, the second storage location 26 is scanned for the requested data. Finally, if neither of the storage locations 24 or 26 of the client 12 contain the requested data, the driver 30 retrieves the data from the file server 10 on the network 20.

The driver 30 may "intercept" requests of the operating system 34 or an application program for the file system 22. The driver 30 may thus act as an interface to file system access. In this way, the allocation of the file system 22 to potentially several storage locations may be transparent to the operating system 34, in one embodiment of the invention.

First Local Store Operation

Figure 3:
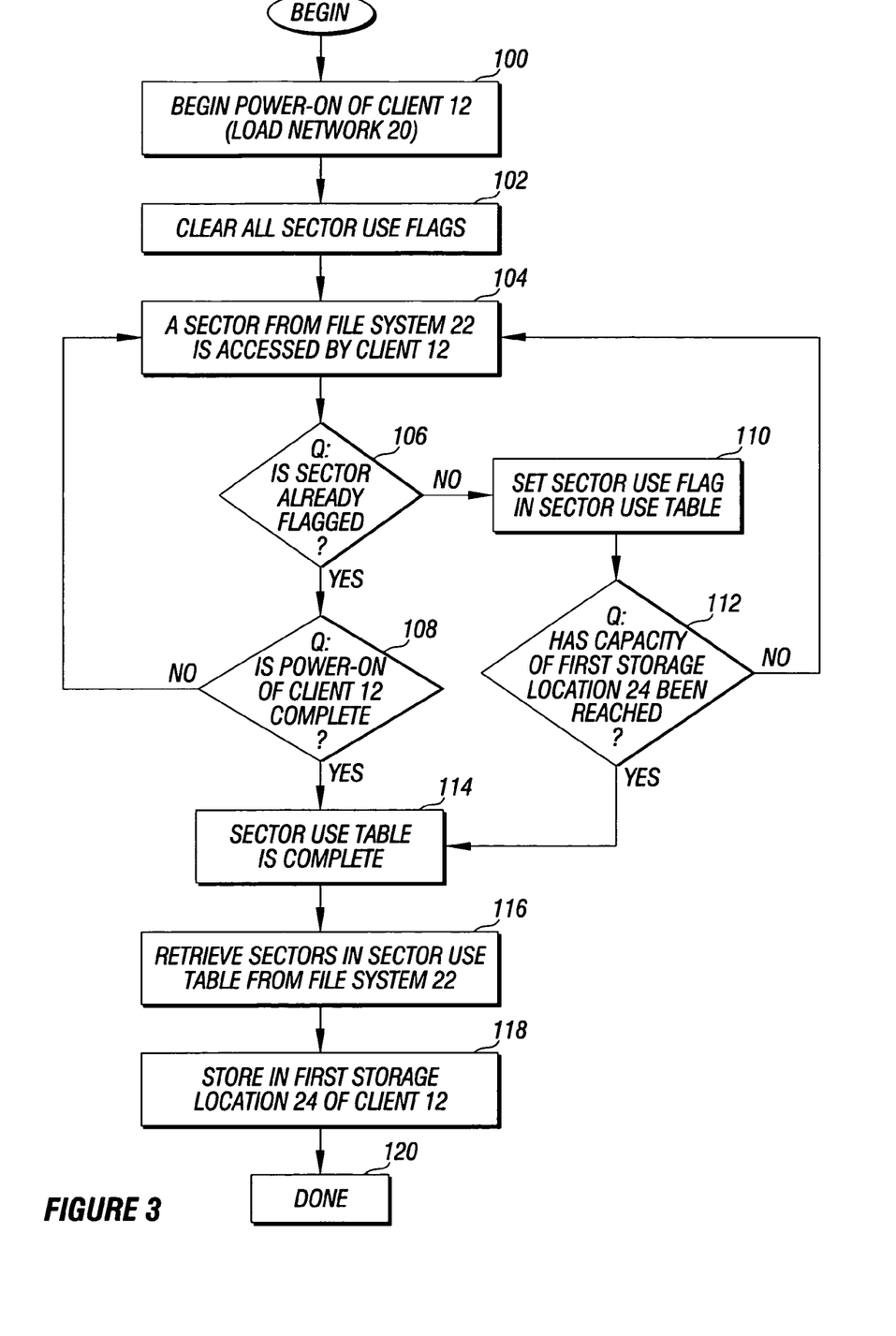
FIG. 3 is a flow diagram of the creation of the first storage location according to one embodiment of the invention.

In FIG. 3, the first local store operation 40 of the driver 30, according to one embodiment of the invention, includes monitoring accesses of the file system 22 by the client 12 during a period of time, such as during the power-on self test (POST) or other start-up operation of the client. Once accesses of the file system 22 by the client 12 are determined, the driver 30 may then store the accessed portions of the client 12 in the first storage location 24.

First, the first local store operation 40 includes powering on the client 12 (block 100). A connection by the client 12 to the network 20 is also made. The driver 30 is ready to monitor access of the file system 22. In FIG. 3, the file system 22, stored on the hard disk drive 8 of the server 10, is made up of a plurality of sectors. Accordingly, in one embodiment of the invention, monitoring access to the file system 22 may be made by monitoring requests for sectors addressed to a part of the hard disk drive 8 where the file system 22 is stored. Alternatively, the file system 22 may be made up of a plurality of bytes, a plurality of files, or other units against which access may be tracked by the driver 30.

Where the file system is embodied as a plurality of sectors, a sector use table is maintained by the driver 30 to keep track of which sectors of the file system 22 are accessed. Each sector of the file system 22 may be assigned a sector usage flag.

Accordingly, in FIG. 3, all sector usage flags are cleared, or set to zero (block 102). The client 12 accesses a sector from the file system 22 (block 104). The driver 30 determines whether the sector has previously been flagged (diamond 106). If not, the sector usage flag for the retrieved sector is set by the driver 30 (block 110).

If a sector has already been flagged (diamond 106), a determination is made whether power-up is complete (diamond 108). If not, a subsequent access of the file system 22 is analyzed (block 104). If, however, the boot process is complete, a complete sector use table, identifying accesses to the file system 22 by the client during POST, has been secured (block 114).

Once the sector use table has been updated (block 110), the size of the sector use table may be compared to the capacity of the first storage location 24 (diamond 112). For example, a typical hard disk drive stores 512 bytes per sector. So, a sector use table with thirty entries indicates that thirty sectors of the file system 22 were accessed by the client 12. Thus, the first storage location 24 of the client 12 requires at least 512×30, or 15,360 bytes of available storage.

Looking back to FIG. 3, if the capacity of the first storage location 24 has been reached, the sector use table may not grow any further. Accordingly, the portion of the file system 22 to be allocated to the first storage location 24 has been determined (block 114). If, instead, the capacity of the first storage location 24 has not been reached, the process of monitoring file system access by the client 12 may be repeated (block 104).

Once the sector use table is complete, the first storage location 24 for the client 12 may be programmed by the driver 30. Thus, the driver 30 retrieves from the file system 22 all sectors identified in the sector use table (block 116). The sectors may then be stored in the first storage location 24 of the client 12. In one embodiment of the invention, flash technology is used for the first storage location 24 and the first local store operation 40 is performed once, the first time the client 12 is connected to the network 20. The first local store operation 40 of the driver 30 is complete (block 120).

The portion of the file system 22 which is stored in the first storage location 24 may be tailored to the use of the file system 22 by the thin client 12. Although the driver 30 tracks usage of the file system 22 during power-on (FIG. 3), the driver may track runtime or other access of the file system 22 by the client 12, as desired.

Some clients 12 may access more of the file system 22 than others. These clients 12 may include a larger first storage location 24, if needed. The first local store operation 40 thus tailors the creation of the first storage location 24 for each client 12, depending upon the particular need for the file system 22.

Furthermore, once the first storage location 24 is created, each subsequent power-on of the client 12 provides access to the file system 22 without requiring a network connection. The first local store operation 40 of the driver 30 may thus diminish network bandwidth that may otherwise be expended to access the file system 22.

Second Local Store Operation

Looking back to FIG. 2, the driver 30 may also perform the second local store operation 42, in one embodiment of the invention. Recall that the second local store operation 42 secures a portion of the file system 22 to the second storage location 26 of the client 12.

During the second local store operation 42, the driver 30 performs multicast retrieval of the file system 22, according to one embodiment of the invention. The retrieved portion of the file system is then stored in the second storage location 26 of the client 12.

For file systems 22 which are accessed by a number of clients 12, individual retrieval by each client 12 may inefficiently consume network bandwidth because each individual connection is transmitting the exact same data. Such an environment may thus be well-suited to performing multicast operations.

Multicasting is the process of sending a message simultaneously to more than one destination on a network. Like broadcasting, multicasting may be used to minimize network bandwidth by establishing a single network connection for multiple client recipients. Unlike broadcasting, however, a multicast operation may be limited to a subset of all clients connected to the network, rather than the entire population of clients.

In one embodiment of the invention, the file system 22 may be multicast across the network 20 by the server 10. Each client 12 may then retrieve the file system 22 according to the individual capacity and needs of the client 12. The driver 30 of each client 12 may "register" for the multicast retrieval.

Figure 4A:
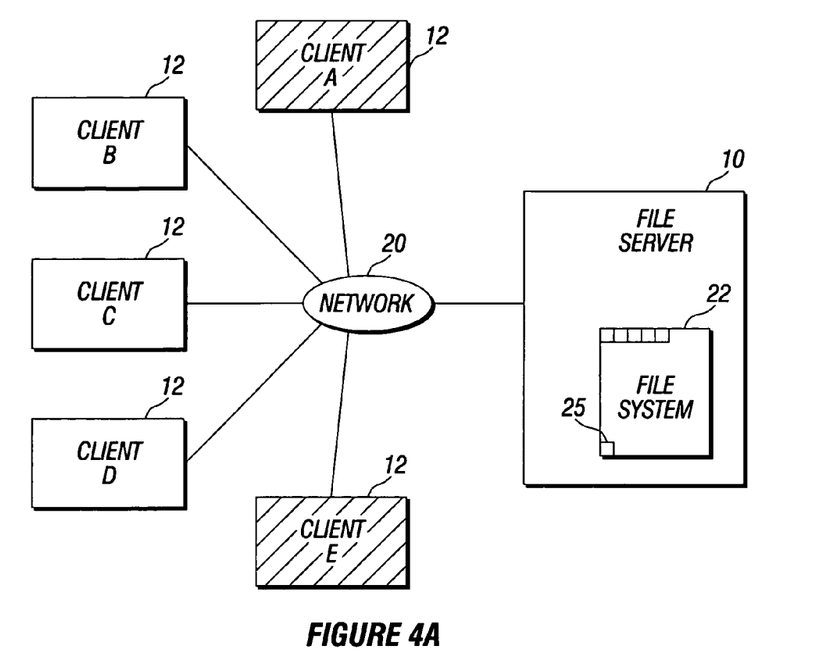
FIG. 4A is a block diagram of a multicast operation according to one embodiment of the invention.

In a multicast operation, the file system 22 may be transmitted across the network 20 in individual packets. The transmission of the file system in packets is also known as streaming. Turning to FIG. 4A, the file system 22 is made up of a plurality of packets 25. Information identifying the intended recipient clients 12, a subset of all possible clients on the network 20, may be included in each packet 25. In the example shown in FIG. 4A, only client A and client E are intended recipients of the packets 25.

A file system of N packets may be multicast, one packet at a time, from packet0 through packet(N−1), by the file server 12 to the network 20. Once the transmitting file server 10 completes multicasting packet(N−1), the server 10 may loop back to packet0 and begin transmission again.

Once the multicast operation commences, the clients 12 may "register" themselves for receipt of the packets 25. Clients A and E may register to receive the multicast; clients B, C and D may register but, because they are not intended recipients, their registration is ignored.

Figure 4B:
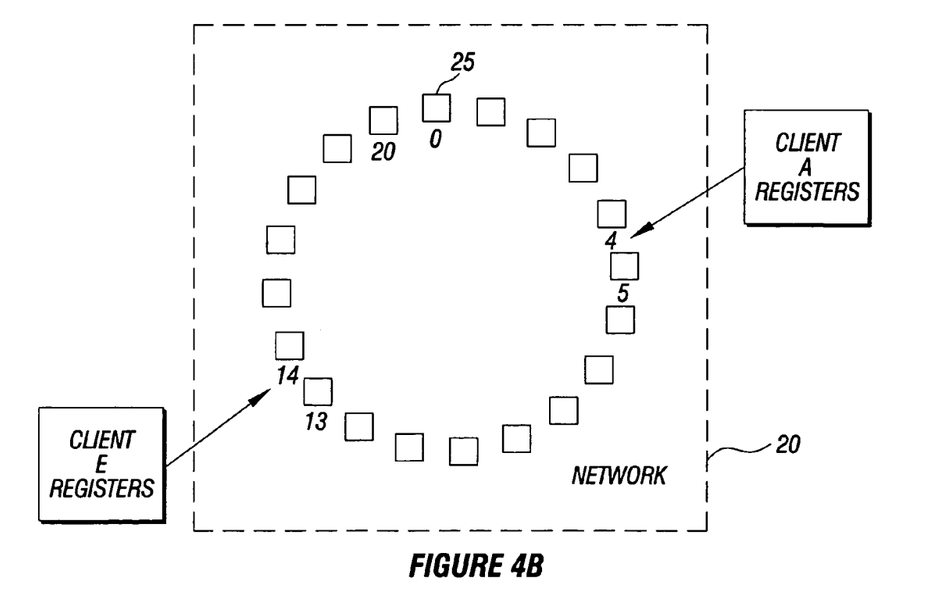
FIG. 4B is a second block diagram of a multicast operation according to one embodiment of the invention.

Because the action of the server 10 is asynchronous to the receipt by the client or clients 12, each client may receive a different packet 25 upon registering. In FIG. 4B, suppose the file system 22 includes twenty-one packets, packet0 through packet20. The multicast operation may begin by transmitting packet0 over the network 20. Client A registers after packet4 has been transmitted. The first packet received by client A is therefore packet5. Client E registers just before packet14 is transmitted. Each client 12 may remain registered until all packets 25 have been received.

In one embodiment of the invention, the driver 30 both registers for multicast retrieval of the file system 22 and keeps track of the packets 25 which have been received by the client 12. The second local store operation 42 may thus be conducted "invisibly" to the user of the client 12 and does not disturb other client operations.

The multicast retrieval of the file system 22 is stored in the second storage location 26 of the client 12, in one embodiment of the invention. The second storage location 26 may provide local storage of a portion of the file system 22 not allocated to the first storage location 24. A portion of system memory 16 of the client 12 may be used as the second storage location 26. As with the first storage location 24, the size of the second storage location 26 may vary, depending upon the characteristics of the client 12.

For the client 12 with sufficient resources to locally retrieve the entire file system 22, all accesses of the file system 22 may be stored and then serviced from the client 12. However, during the second local store operation 42, the operating system 34 may request access to the file system 22 which has not yet been stored on the client 12. Additionally, the client 12 may be limited in its storage capacity such that the entire file system 22 may not be stored locally. In either case, the driver 30 may access the file system 22 from the server 10 on the network 20.

In contrast to the first local store operation 40, which may be performed the first time the client 12 is connected to the network 20, the second local store operation 42 may be performed every time the client 12 is powered on. Recall that, in one embodiment of the invention, the second storage location 26 is a volatile storage medium. Thus, once power to the client 12 is removed, the contents of the second storage location 26 are lost.

Alternatively, the second storage location 26 may be a non-volatile medium. Accordingly, the second local store operation 42 may be performed only during specified times. For example, the second local store operation 42 may be performed periodically, such as every tenth boot of the client 12, at the beginning of each month, upon receiving notification that the file system 22 has been updated, or as specified by the user of the client 12.

Retrieval Operation

Looking back to FIG. 2, in one embodiment of the invention, the driver 30 may also perform the retrieval operation 44. During the retrieval operation 44, the driver 30 responds to requests for a portion of the file system 22.

Figure 5:
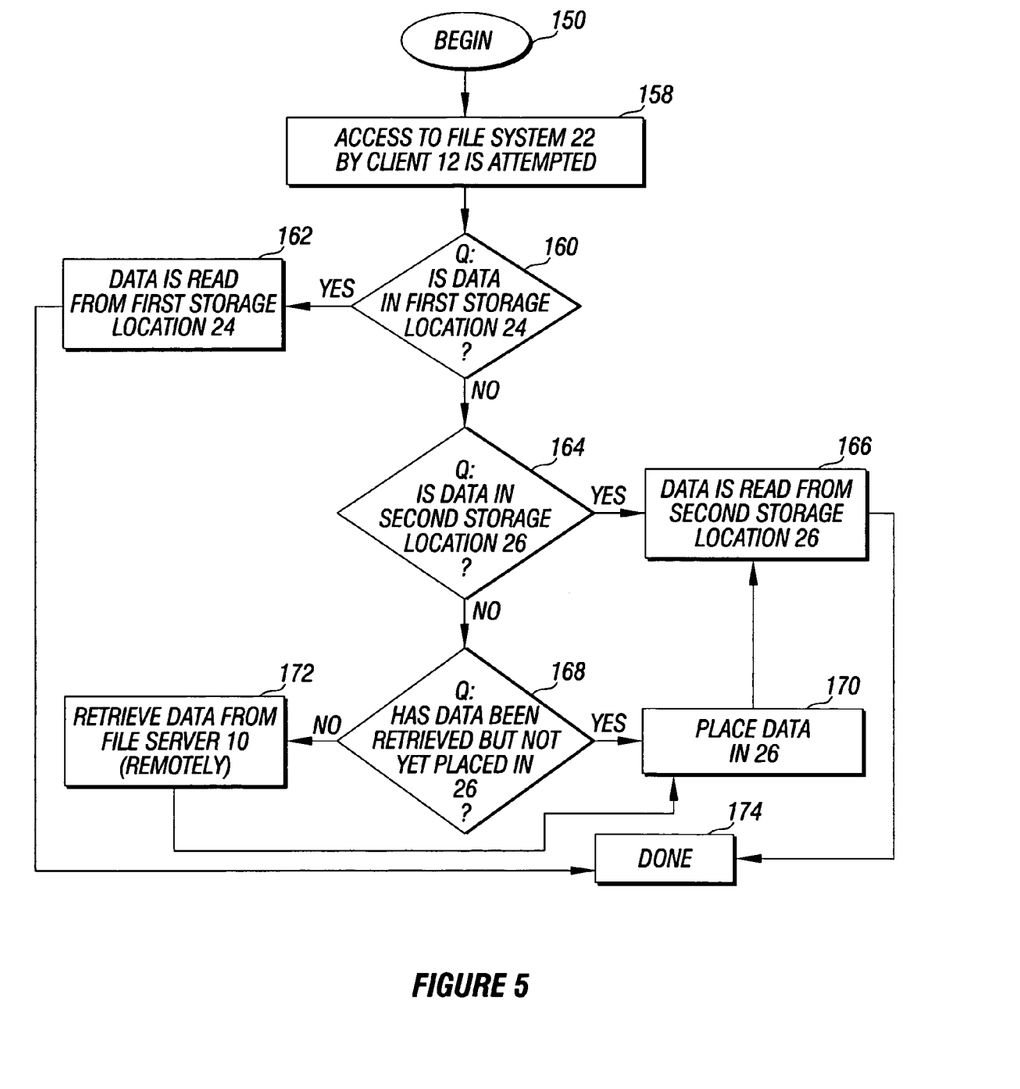
FIG. 5 is a flow diagram of the distributed file retrieval according to one embodiment of the invention.

Turning to FIG. 5, the request may be received from the user of the client 12, the operating system 34 of the client 12, or from an application program (block 158). The driver 30 determines whether the requested portion of the file system 22 is located in the first storage location 24 or the second storage location 26.

If the requested portion of the file system 22 is available on the client, network access is unnecessary. If the portion is not found on the client 12, however, the driver 30 may still retrieve the requested data from the network server 10. Accordingly, in FIG. 5, the driver 30 makes a series of queries.

The first storage location 24 is tested for presence of the requested data (diamond 160). If found, the data may be read from the first storage location 24 (block 162). Otherwise, a determination may be made whether the requested data is located in the second storage location 26 (diamond 164). If so, the driver 30 reads the data from the second storage location 26 (block 166). From either blocks 162 or 166, the retrieval of the requested data is complete and access to the network 20 is unnecessary.

If the data is neither in the first storage location 24 nor the second storage location 26, the driver 30 may next determine whether the data has been retrieved but not yet placed in the second storage location 26 (e.g., the data may be in another portion of memory) (diamond 168). If so, the data may be placed in the second storage location 26 (block 170). The data may then be read from the second storage location 26 (block 166). If, instead, the data has not been retrieved, the driver 30 may retrieve the data remotely, across the network 20, from the file server 10 (block 172).

In retrieving the data from the server 10, the driver 30 may wait for the multicast operation to complete. During the second local store operation 42, the driver 30 is retrieving the contents of the file system 22 to the second storage location 26. Alternatively, the driver 30 may perform a discrete retrieval of the requested data from the file system 22.

This second alternative may be desirable, for example, when the data requested is near the end of the multicast retrieval currently taking place. For example, looking back to FIG. 4B, if client A needs packet4, but registers for multicast at packet5, the driver for client A may decide to access packet4 from the server 10, rather than waiting for the production of packet4 from the multicast operation.

Whether as a result of the multicast retrieval or accessing the file server 10, the block driver 30 places the data in the second storage location 26. Once retrieved, the data may be read from the second storage location 26 (block 166).

Thus, a distributed file system including multicast retrieval by one or more clients on a network may be particularly suitable for clients with limited storage capabilities who need to access large file systems. Where the distributed file system efficiently distributes the large file system between the server and the clients in relationship to the characteristics of each client, the traffic upon the network may be relieved and the speed of retrieval for the client may increase. Where multicast technology for transmittal of the entire file system to multiple clients is leveraged, bandwidth utilization between the clients and the network server may be reduced. When the multicast operation is performed in a background mode, disruption of other tasks by the client are reduced. Access to the remote server by the client remains available when multicast retrieval is inefficient or when otherwise desired.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    upon an initial connection to a network, accessing a first portion of a file system from a server and storing said first portion in non-volatile memory;
        receiving a request for a second portion of a file system after said initial connection;
        identifying whether the second portion is stored in said non-volatile memory by associating portions of the file system used by the client during start-up with the first location;
        wherein associating further comprises:
    retrieving a plurality of portions from the file system using multicasting;
        storing the plurality of portions in the second location;
    if not, determining whether the second portion is stored in a volatile storage associated with portions of the file system that were multicast to the client by a server; and
    if not, retrieving the second portion from the server in a multicast operation.

2. The method of claim 1, wherein determining further comprises associating the second location with portions of the file system that were streamed to the client using a multicast operation.

3. The method of claim 1, further comprising waiting for the portion to be streamed to the client if not stored in the second location.

4. A system including:
a processor;
a non-volatile memory coupled to said processor;
a volatile memory coupled to said processor; and
a storage medium including a software program that, upon execution:
upon an initial connection to a network, accesses a first portion of a file system from a server and storing said first portion in the non-volatile memory, receives a request for a second portion of a file system after said initial connection, identifies whether the second portion is stored in the non-volatile memory by associating portions of the file system used by the client during start-up with the first location;
wherein associating further comprises:
monitoring accesses to a plurality of portions of the file system during start-up;
retrieving the plurality of portions from the file system;
storing the plurality of portions in the first location;
retrieving a plurality of portions from the file system using multicasting;
storing the plurality of portions in the second location; and
if not, determining whether the second portion is stored in the volatile memory and, if not, retrieving the second portion from the server in a multicast operation.

5. The system of claim 4, wherein the non-volatile storage medium is a flash memory device.

6. The system of claim 4, wherein the volatile storage medium is a memory device.

7. The system of claim 4, wherein the first location comprises portions of the file system used by the client at start-up.

8. The system of claim 4, wherein the software program, upon execution, retrieves the portion from the server if not stored in the second location.

9. The system of claim 4, wherein the contents of the second location are procured as a background operation.

10. An article comprising a non-transitory medium storing instructions that cause a processor-based system to:
upon an initial connection to a network, access a first portion of a file system from a server and storing said first portion in non-volatile memory;
receive a request for a second portion of a file system after said initial connection;
identify whether the second portion is stored in the non-volatile memory by associating portions of the file system used by the client during start-up with the first location;
wherein associating comprises:
monitoring accesses to a plurality of portions of the file system during start-up;
retrieving the plurality of portions from the file system;
storing the plurality of portions in the first location;
retrieving a plurality of portions from the file system using multicasting;
storing the plurality of portions in the second location;
if not, determine whether the second portion is stored in a volatile storage associated with portions of the file system that were multicast to the client by a server; and
if not, retrieve the second portion from the server in a multicast operation.

11. The article of claim 10, wherein the non-transitory medium storing instructions is a flash memory device.

12. The article of claim 10, further storing instructions that cause the processor-based system to retrieve the portion from a server if not stored in the second location.

13. The article of claim 10, further storing instructions that cause the processor-based system to determine the contents of the first location by monitoring access of the file system during a predetermined time period.

14. The article of claim 13, wherein the instructions that cause the processor-based system to determine the contents of the first location by monitoring access of the file system during a predetermined time period are executed once.

15. The article of claim 10, further storing instructions that cause the processor-based system to:
determine whether the portion will be stored in the second location within an allotted time period; and
retrieve the portion from a server if not stored in the second location within the allotted time period.

* * * * *